No. 633,560. Patented Sept. 26, 1899.
J. B. BARTHOLOMEW.
STRAW STACKER.
(Application filed May 28, 1895. Renewed Nov. 18, 1898.)
(No Model.) 6 Sheets—Sheet 1.
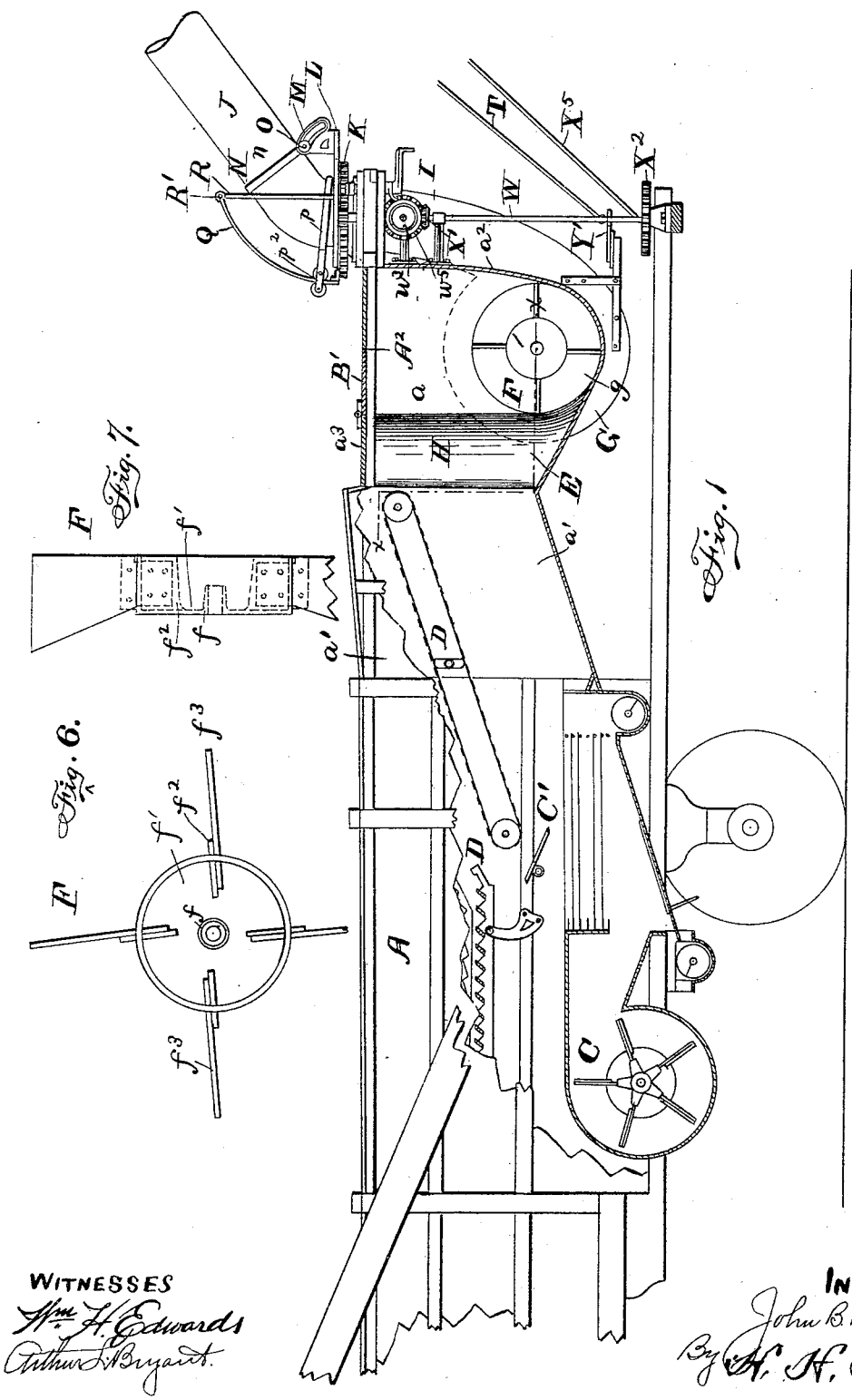
WITNESSES
INVENTOR

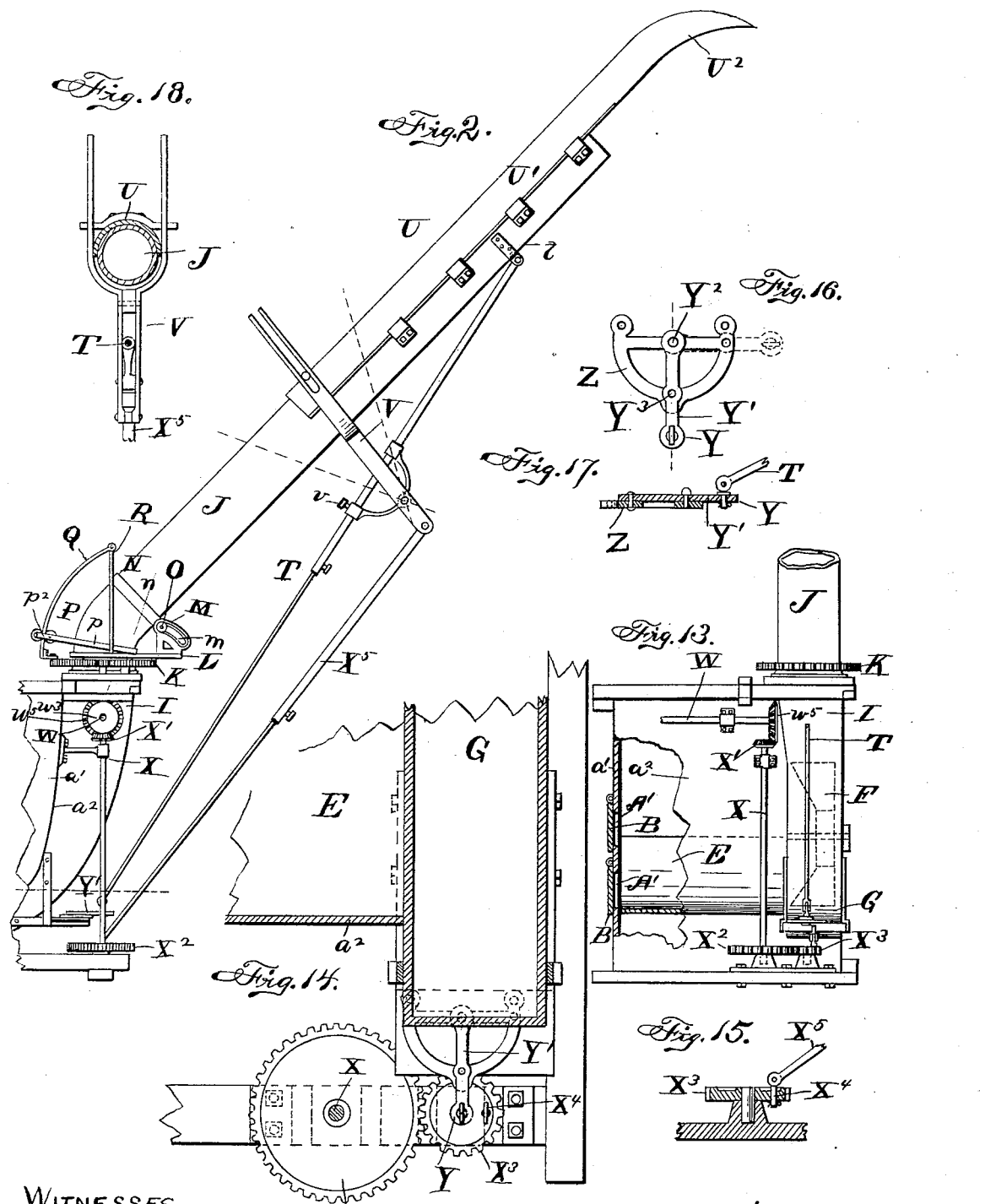

No. 633,560. Patented Sept. 26, 1899.
J. B. BARTHOLOMEW.
STRAW STACKER.
(Application filed May 28, 1895. Renewed Nov. 16, 1898.)
(No Model.) 6 Sheets—Sheet 3.

WITNESSES
Wm. H. Edwards
Arthur L. Bryant

INVENTOR
John B. Bartholomew
By H. H. Bliss
Atty.

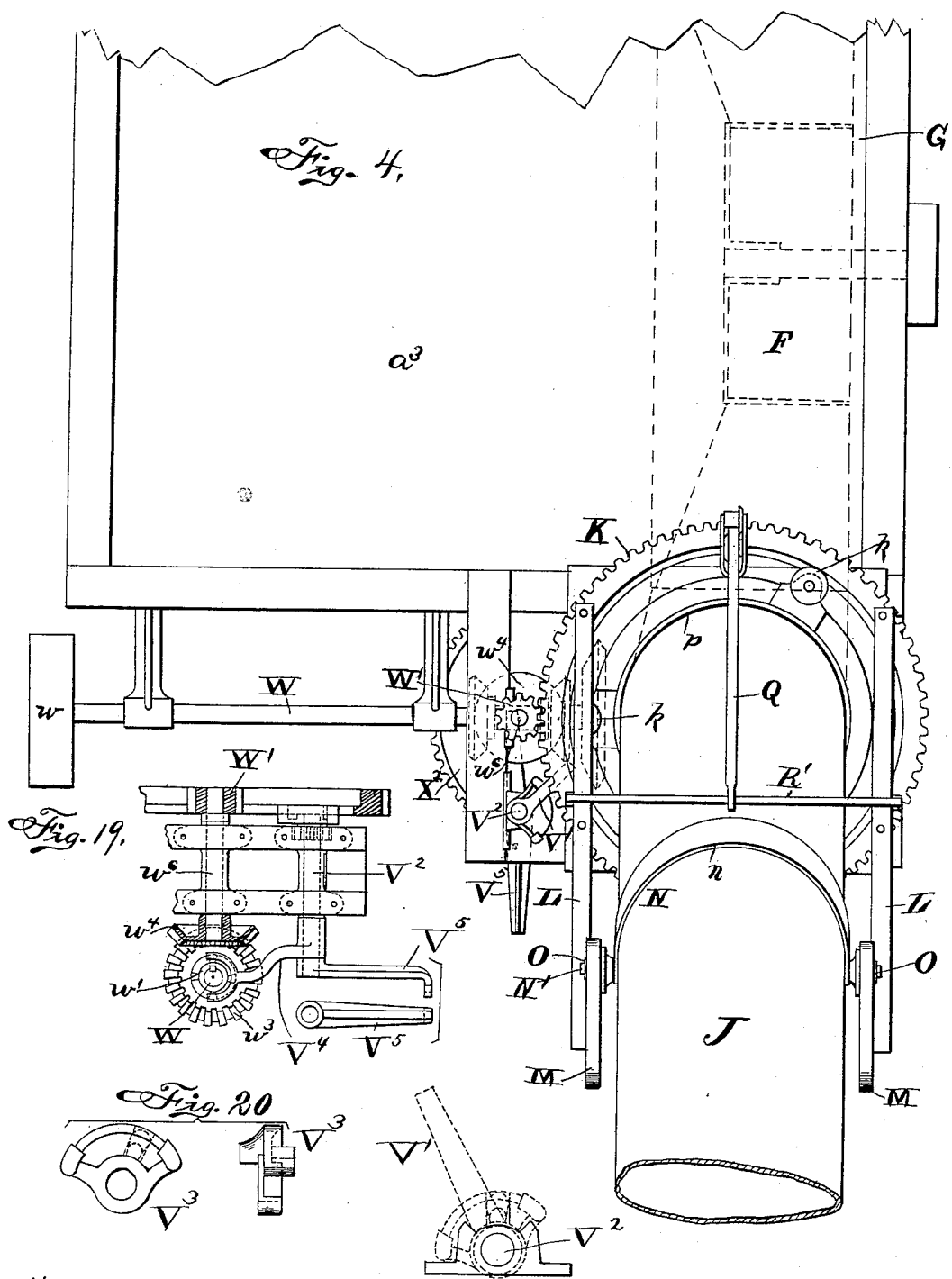

No. 633,560. Patented Sept. 26, 1899.
J. B. BARTHOLOMEW.
STRAW STACKER.
(Application filed May 28, 1895. Renewed Nov. 18, 1898.)
(No Model.) 6 Sheets—Sheet 5.
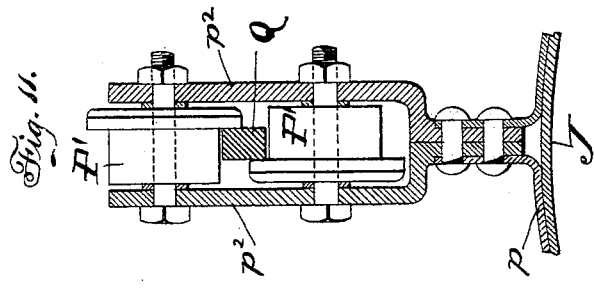
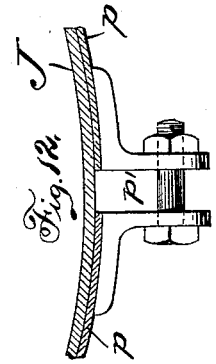
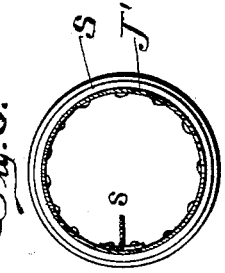
Witnesses
Wm H. Edwards
Arthur L. Bryant
Inventor:
John B. Bartholomew
By H. S. F. Bliss
Atty.
THE NORRIS PETERS CO., PHOTO-LITHO., WASHINGTON, D. C.

No. 633,560. Patented Sept. 26, 1899.
J. B. BARTHOLOMEW.
STRAW STACKER.
(Application filed May 28, 1895. Renewed Nov. 18, 1898.)

(No Model.) 6 Sheets—Sheet 6.

Witnesses
Wm H Edwards
Arthur L Bryant

Inventor
J. B. Bartholomew
By
H. H. Bliss atty

UNITED STATES PATENT OFFICE.

JOHN B. BARTHOLOMEW, OF PEORIA, ILLINOIS, ASSIGNOR TO THE AVERY & ROUSE STEAM THRESHER COMPANY, OF SAME PLACE.

STRAW-STACKER.

SPECIFICATION forming part of Letters Patent No. 633,560, dated September 26, 1899.

Application filed May 28, 1895. Renewed November 18, 1898. Serial No. 696,825. (No model.)

*To all whom it may concern:*

Be it known that I, JOHN B. BARTHOLOMEW, a citizen of the United States, residing at Peoria, in the county of Peoria and State of Illinois, have invented certain new and useful Improvements in Straw-Stackers; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 9:
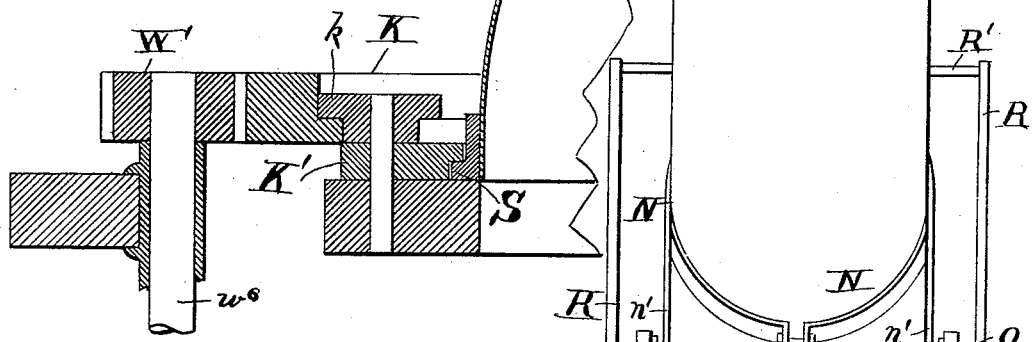
Figure 3:
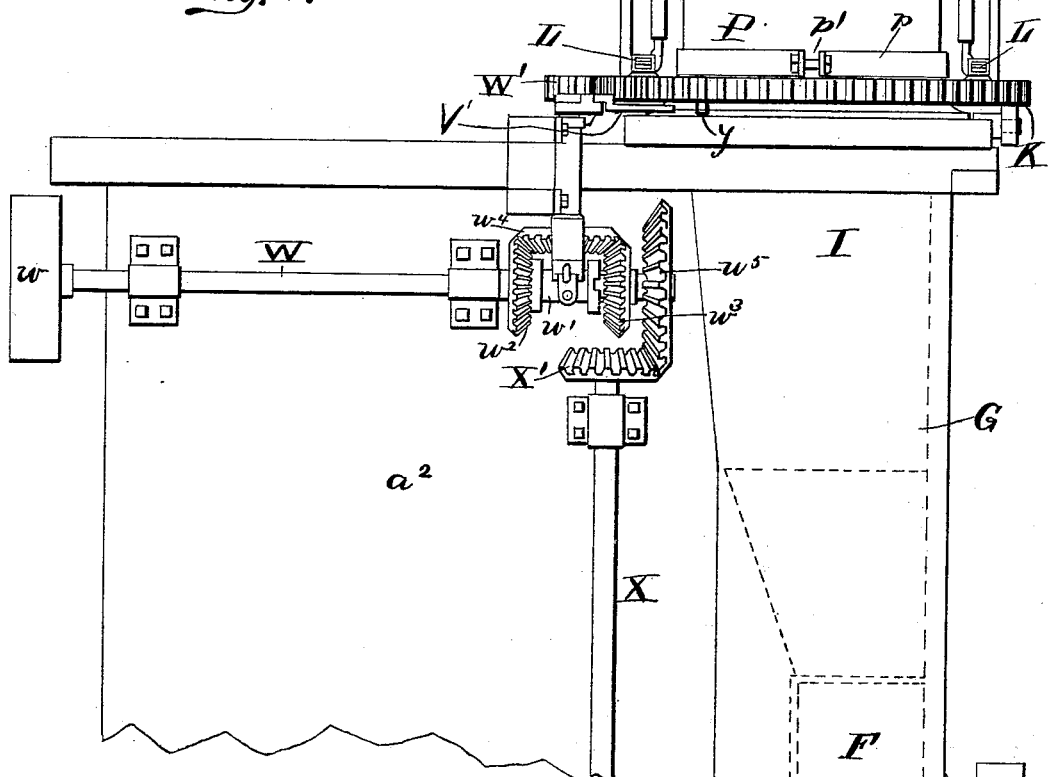
Figure 22:
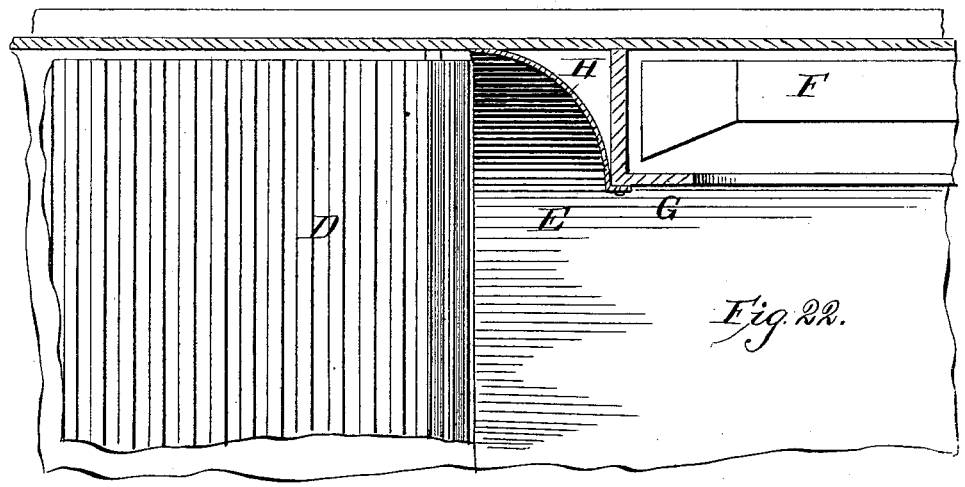
Figure 23:
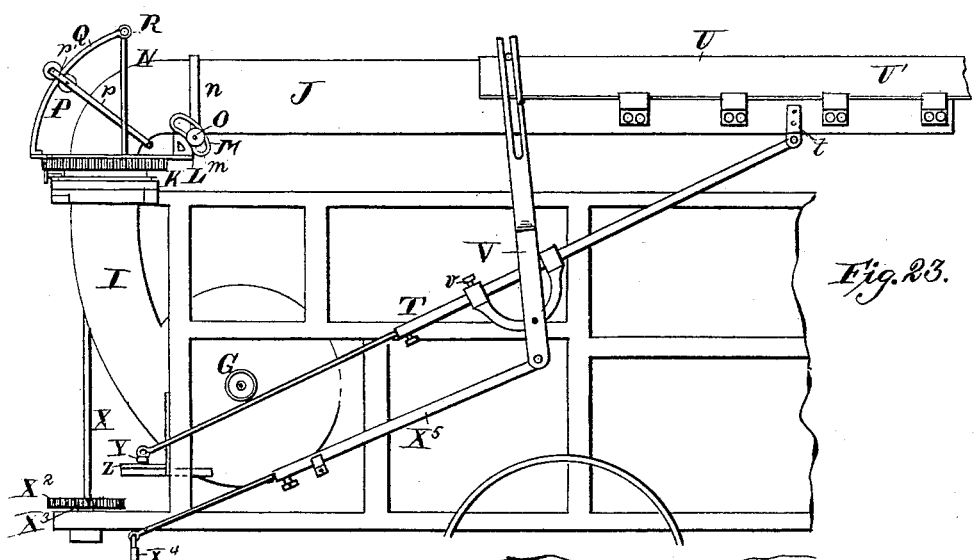
Figure 24:
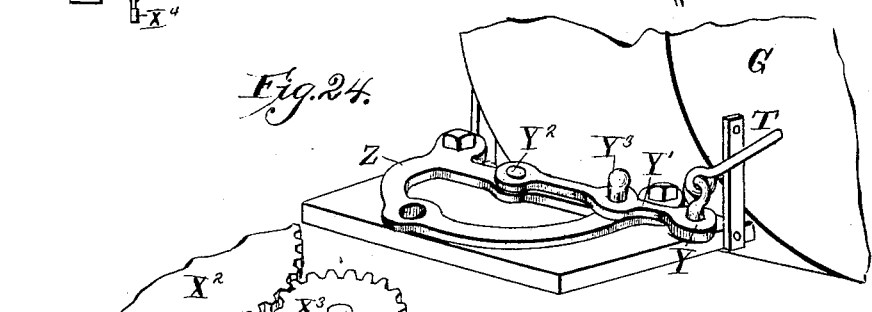

Figure 1 is a view, partly in side elevation and partly in section, of a mechanism embodying my improvements. Fig. 2 is a side elevation of the stacker mechanism. Fig. 3 is a rear view of the parts at the base of the stacker mechanism on a larger scale. Fig. 4 is a plan view of the same. Fig. 5 is a vertical section of the same. Fig. 6 is a face view of the rotary parts of the fan or ejector. Fig. 7 is an edge view of part of the same. Fig. 8 is a cross-section of the intermediate part of the stacker-trunk. Figs. 9, 10, 11, and 12 show details of some of the parts for supporting the upper trunk and for adjusting it horizontally and vertically. Fig. 13 is a rear view showing the parts for vibrating the straw-deflector. Fig. 14 is a view, partly in horizontal section and partly in plan view, illustrating some of the last said parts. Fig. 15 is a section of the wheel which effects the said vibrating. Fig. 16 is a plan, and Fig. 17 a section, of the devices which hold the lower end of the brace for the upper wind-trunk. Fig. 18 is a cross-section of the wind-trunk, showing the lever for reciprocating the straw-deflector. Figs. 19 to 21 are detail views of the devices for regulating the direction of movement of the stacker-spout. Fig. 22 is a horizontal sectional view on the line $x\ x$ of Fig. 1 through a portion of the apparatus, showing in detail the straw-guide adjacent to the fan. Fig. 23 is a side elevation of a portion of the machine, showing the arrangement of parts when the stacker-spout is in non-working position or when the machine is arranged for transportation. Fig. 24 is a perspective detail view showing the relative positions of the parts at the inner end of the brace or support of the stacker-spout when the parts are in the positions shown in Fig. 23.

This invention relates to improvements in pneumatic devices for removing the straw from threshing-machines and forming stacks therewith. Mechanisms of various sorts have been heretofore made or suggested for accomplishing this purpose—that is to say, for taking the straw after it leaves the separating devices and by means of currents of air withdrawing it from the separating-chamber, forcing it through adjustable ducts, and depositing it in a stack. In some of the said earlier machines the air duct or trunk has been formed in two main sections, one adjacent to the separating-chamber and the other extending backward therefrom and serving to deliver the straw, these two sections of the trunk or duct being connected together by means of a hinge so arranged that the outer end of the rear section can be adjusted vertically. In other cases the hinge has been dispensed with and a flexible tube of one sort or another has been combined with the inner and the outer sections of the air-trunk, the flexible part being connected to the lower or inner end of one and to the upper end of the other. Experience has shown that serious difficulties are incident to each of these constructions. It is desirable and (to produce the lightest, most durable, and cheapest form of mechanism) necessary that comparatively thin sheet metal should be employed for the tubing for the trunk-sections. When these are united by a hinge that is expected to hold them firmly in proper relative position, the strain and torsion is so severe that complicated frames have to be combined with the trunk-sections to support them properly. The flexible pipes or tubes when made in metallic sections are expensive and comprise numerous small parts which when subjected to use and wear are liable to breakage or to be thrown out of proper fitting relations, and when they are made of non-metallic material they have but short life and are liable to rapid destruction.

One of the objects of the present invention is to obviate these difficulties. This is accomplished by means of a construction and relation of parts which will be understood from the drawings in connection with the description below.

In the drawings the separating mechanism is indicated as a whole by A. This may be of any of the numerous forms now well known and need not be described in detail. The rear end of the separating-chamber is more or less completely inclosed, as by side walls $a'$, a rear wall $a^2$, and a top or cover $a^3$, forming a frame for supporting the stacking mechanism; but it is necessary in order to attain the best results to allow for an ingress of external air, and I provide an inlet aperture or apertures A' in the side wall $a'$, and as the air should for some materials be taken in on lines differing from those for others I provide also air-inlets at $A^2$ in the cover $a^3$. By a valve or door B, I control the air entering the aperture A', and by valves or doors B', I control that which enters the aperture at $A^2$.

The winnowing-fan is indicated by C and the shoe by C'. These parts are also to be constructed or arranged in any preferred way.

D indicates generally the separating-table, from which the larger straws are delivered at the rear. The chaff, dust, and fine stuff from the shoe and the larger straws from the separating-table are deposited in a receptacle E, which is concave or trough-like in shape and extends from the wall $a'$ part way across the machine to a wall $a$.

F is an ejector so constructed and operated as to serve both as an exhaust and force fan and also as a throwing or propelling device. It is constructed with a hub $f$, having a disk or radial arms $f'$, expanded at their outer ends, as at $f^2$, and to the latter the blades $f^3$ are secured. This fan is mounted in a casing or box G, which is situated eccentrically as to the longitudinal lines of the machine, but is arranged inside of the side wall $a'$ of the separator. As a result of this arrangement I avoid extending the machine laterally and can provide for the perfect balancing of it with respect to the separator-wheels. By having the central part of the form of a disk, such as shown at $f'$, I insure that the straw shall be guided immediately into the region of greatest centrifugal action, so that it can be both forced along by the direct propulsion of the blades and also lifted and carried more readily and continuously by the currents of air. It will be seen by examining Figs. 7, 3, and 4 that the disk $f'$ is situated in a transverse plane between the inner and the outer walls of the ejector-casing. The shaft extends from said disk outward through the casing to the driving-pulley. An unobstructed passage-way is provided for the straw between the disk and the inner wall of the casing, from which it is guided immediately outward radially and prevented from traveling along the axis of the fan. The blades $f^3$ are tapered on their inner edges, being secured to the outer or rear side of the disk $f'$ and extending inward, because of the taper, across the aforesaid chamber or open space between the plane of the disk and the inner casing-wall. The outer ends of the blades are approximately as wide as the ejector-casing, whereas the distance is considerably less between the disk and the outer casing-wall.

At H chutes or guides are provided, so arranged as to throw the straw from the separating-table D inward from the side wall $a$ in order that it may have ready access to the chamber G.

$g$ indicates a large opening on the inner side of the chamber or case G. It is concentric with the ejecting-fan F and of such dimensions as to permit the straw and other material to enter the ejector-chamber without interference.

The fan-chamber G connects with the trunk or duct I, which extends upward to and through the top wall of the casing. The straw and material are forced upward through this duct I and carried rearward and upward through the adjustable trunk-section J. The latter is supported as follows:

K is a toothed ring-like plate or centrally-open wheel mounted on a guiding and holding plate K', the latter being secured to the top of the main frame.

$k$ are antifriction wheels or rollers interposed between the guide-plate K' and the movable toothed ring K.

L are bars, of angle-iron or other suitable material, secured to the top of the toothed ring K and so placed as to leave a sufficiently large open space at the center. These bars L each have one end extended somewhat beyond the periphery of the ring and carry the standards M. These standards extend upward and are formed with guideways consisting of slots $m$.

N is a bar bent to form a band, as at $n$, which can be riveted to the trunk-section J and extends down on each side of the trunk to provide legs $n'$. These are joined by a bracing-bar N', which at the ends has projections adapted to coöperate with the aforesaid guides $m$. Preferably these projections carry antifriction wheels or rollers O, which are fitted in the slots and have flanges which prevent them from being displaced laterally. It will be seen that if the trunk-section J is at this rear end pushed inward the guiding devices will move up and back in the guideways $m$.

To reinforce the support and carrier thus provided, I employ a brace, (indicated as a whole by P.) It has a band $p$, formed, preferably, in two halves, adapted to surround the trunk-section J near its end and to be clamped tightly thereto by the ears and bolt at $p'$. It also has an upward-projecting extension formed of the metallic pieces $p^2$, between which are mounted the antifriction wheels or rollers P'.

Q is a guide having its lower end secured to the toothed ring K. At its upper end it is supported by uprights R R, secured to the said bars L and joined at their upper ends by a cross-bar R', which receives the said guide Q at its center.

When the trunk-section J is pushed inward, the bracing devices at P and Q furnish not only a guide, but also a firm holder, they, together with the guiding devices M and N, taking all the strain and torsion from the thin metal of the trunk.

Between the main trunk-section J and the above-described fan-duct I, I place an intermediate section J'. This is disconnected from the other parts of the trunk, so that it is relieved entirely from load and strain and can be therefore more durable than is the case in the machines where the parts corresponding to those at J and J' are joined mediately or immediately by a hinge. The trunk-section J' has a mounting independent of the section J, so as to be entirely loose with respect thereto. At its lower end it has a flanged ring S, riveted or otherwise secured to the sheet metal and fitted within the stationary ring K', the fit being a loose one, so that it can turn with the utmost freedom. In order to have this section J' properly directed automatically by the air-blast itself, I combine therewith one or more interior vanes $s$. When the outer section J is turned with the ring K to one or another inclination horizontally, the force of the air-blast immediately causes the loose intermediate section J' to take the proper corresponding position.

It will now be seen that I provide a simple but strong support for the movable trunk-section independently of the intermediate part J', said support having a wide base, so that the part J is held with the utmost firmness.

In order to adjust the trunk-section J as desired, I combine with it an extensible brace, (indicated as a whole by T.) It is connected at its upper end to a ring or band $t$ and extends downward and inward to the vertical line of the axis of the ring K. Its lower end rests upon or is secured to a rotatable base Y. Any suitable means can be used for extending the brace. When it is extended, the outer end of the trunk-section J is elevated, and the result is a tendency for it to move inward, which at the inner end causes the bracing and guiding devices to move in the way described with respect to the parts at $m$ and O.

With the trunk-section I combine a device for varying automatically the place of delivery of the straw, so that the form of the stack can be readily controlled at any time. The trunk-section J is provided with a guide or deflector U for the blast. This comprises the parts U' and $U^2$. Preferably the part U' is a concave-convex sheet-metal plate adapted to slide longitudinally out and in with respect to the section J. The outer part $U^2$ is inclined downward somewhat to properly guide the straw as it is delivered. The part U' being a continuous sheet, at the top the air is compelled to travel beneath it in much the same way that it travels through the part J; but as the outer portion is bent the straw will be dropped at points governed by the position to which the part U' is moved. This guide or deflector U is reciprocated automatically by any suitable devices. As shown, there is at V a rocking lever pivotally supported on the brace T. At its upper end it is loosely connected to the guide U, and at its lower end it is connected with devices which impart to it a reciprocation. The result of the presence of these parts is to vary within certain limits the point of deposit of the straw—that is to say, during the vibration of the trunk in its horizontal movements the deflector or guide U is caused to move outward and inward by the actuating devices described from the outer circle of deposit to the inner—and consequently the straw is uniformly piled from the base to the top of the stack. In order to vary the distance between the inner arc and the outer one, the lever can be adjusted so as to vary the throw of the guide or deflector U, and hence I am able to top off the stack—that is to say, to narrow it more or less gradually or rapidly, as desired—as it reaches the upper part of the intended limit. One way to accomplish this is shown, there being at $v$ means for adjusting the position of the pivot on which the lever V rocks. When this pivot is moved nearer to the upper end of the brace, the radius of movement is shortened and the deflector or guide moves out and in in shorter paths. The lever V may be oscillated in any suitable way. As shown, it gets its movements from devices which oscillate or vibrate the plate or table K and the delivery-spout of the stacker.

W is a shaft mounted across the rear of the machine and through a belt-wheel $w$, receiving power from any suitable driver. It carries a sliding clutch $w'$, adapted to engage with either of two bevel-wheels $w^2$ and $w^3$.

$w^2$ is a bevel-wheel engaged with the bevel-wheels $w^2$ and $w^3$. The wheel $w^4$ is secured to the shaft $w^6$, which carries a pinion W', engaging with the toothed ring K.

Any suitable trip mechanism can be interposed between the ring K and the clutch $w'$ for the purpose of throwing it from one of the two wheels $w^2$ and $w^3$ to the other. That shown consists of the lever V', adapted to be impinged on by pins or lugs carried by the ring K. It is loosely mounted on a shaft $V^2$ and is adapted to be intermittingly connected therewith by the collar $V^3$. The shaft $V^2$ carries the shipping-lever $V^4$, which engages with the clutch $w'$. The clutch can be operated independently of the above mechanism by means of the lever $V^5$.

X is a shaft having a bevel-wheel X', which engages with the wheel $w^5$, which is mounted on the shaft W. Said shaft X extends downward and carries a wheel $X^2$, which engages with a wheel $X^3$, the axis of which is coincident with the axis of the ring K. Wheel $X^3$ is provided with a crank-pin $X^4$, connected by link $X^5$ with the aforesaid lever V, and when the last-described parts are in action it will be seen that a reciprocating movement will be imparted to the lever, which will result in moving the deflector or guide U out and in. Preferably the parts are so arranged that as the trunk J is elevated the link will be so moved as to throw the deflector or guide U relatively farther out, so that the center of the stack will be maintained in the same vertical lines.

The support at Y, which receives the lower end of the brace T, is carried by an arm $Y'$, which is pivoted at $Y^2$. It is locked by a pin at $Y^3$. When the machine is to be in operation, the support Y is moved so that it coincides with the axis of the ring K. When the parts are to be arranged for transportation, the arm $Y'$ is loosened and turns around to the position shown in dotted lines, Fig. 16, and again fastened. This permits the trunk-section J to be turned around to the side of the machine. The arm $Y'$ is supported on a holder Z, which projects outward from the frame of the machine sufficiently to have it accomplish its purpose. In the embodiment of my invention herein illustrated the base Y at the lower end of the brace extends through an aperture formed in the bar $Y'$, near one end thereof, in such manner as to turn freely therein. By thus connecting the brace to the frame of the machine at a point in the plane of the axis of rotation of the ring or plate carrying the trunk I provide for supporting the trunk firmly at all times without interfering with the lateral oscillations thereof, and I am also enabled to swing the stacker-tube when not in use forward over the body of the machine without disengaging the brace from the frame. When the stacker is in operation, the arm $Y'$ is locked in the position indicated in full lines in Fig. 16 and also shown in Figs. 1, 13, and 14; but when it is desired to swing the tube forward over the thresher such arm can be moved into the position indicated in dotted lines in Fig. 16, being substantially at right angles to that formerly occupied by it.

I am aware of the fact that it has been proposed to construct a straw-carrier with a main frame entirely independent of and supplemental to the threshing and separating mechanism and having the stacking-frame mounted upon swinging uprights or standards with downward-extending braces; but I believe myself to be the first to have devised a pneumatic stacker and a simple support of the kind herein illustrated having a brace extending downward and backward from a point relatively near the outer end of the wind-trunk and both parts so arranged that they can be readily applied directly to the rear end of the framework and casing of the threshing and separating mechanism in such way as to dispense entirely with the numerous complicated parts and the supplemental supporting devices that have been heretofore required when endless-belt stackers were used. Heretofore in the construction of pneumatic stackers lifting and supporting mechanisms have been used which were extended to points above the wind-trunk. With an under inclined brace I can remove from above the trunk many or all of the upward-projecting parts present in earlier constructions and place the trunk upon the top of the elevated frame or casing, so that the machine as a whole can be readily taken into a barn or other place where are present obstructions such as to interfere with the movements of pneumatic stackers as heretofore constructed. I can provide for folding the stacker or arranging over the top of the machine, notwithstanding the presence of the brace, in a manner substantially such as above described.

I have shown and described herein the brace system which I have devised, but do not herein broadly claim the features incident thereto, having presented claims therefor in my other application, Serial No. 696,826, originally filed February 1, 1896, preferring to retain herein only those claims which relate to matters incident to the particular construction herein shown—as, for instance, the mounting of the deflector-moving devices on the brace. I do, however, herein present claims, as appears below, for the features of invention relating to the automatic moving of the deflector longitudinally of the duct by power devices independent of hand actuation, although I do not herein claim any of the subject-matter presented in the claims in my other application, Serial No. 696,827, originally filed December 30, 1897, wherein are also shown mechanisms for automatically actuating the deflectors of pneumatic stackers.

What I claim is—

1. In a pneumatic straw-stacker, the combination with the straw-duct, of the movable deflector at the outer end of said duct and held in a position fixed relatively to the longitudinal lines of the duct, but movable relatively to the transverse planes of the duct, and the automatically-acting power devices for moving the deflector as aforesaid, independently of hand actuation, substantially as set forth.

2. In a pneumatic straw-stacker, the combination with a vibrating straw-delivery duct, and power devices for vibrating the duct, of a longitudinally-reciprocating deflector extending beyond the duct, and means for varying the length of the path through which the deflector moves relatively to the straw-duct, substantially as set forth.

3. In a pneumatic straw-stacker, the combination with a supporting-frame, power devices thereon, a casing on said frame, a rotary fan or ejector within said casing and a straw-delivery guide communicating with the ejector-casing and having two telescoping parts, of reciprocating mechanism connected to the outer part of the straw-guide, and means actuated by the power devices and connected to said reciprocating mechanism for automatically moving the outer part of the straw-guide out and in along the inner part, substantially as set forth.

4. In a pneumatic straw-stacker, the combination with a supporting-frame, a casing on said frame, a rotary fan or ejector within said casing, a straw-guide communicating with the ejector-casing and having an inner part and an outer part telescopically connected, and power devices for vibrating the straw-guide horizontally, of mechanism actuated by said power devices for automatically moving the outer part of the straw-guide outwardly simultaneously with but independently of the horizontal movement of the inner part of said guide, substantially as set forth.

5. In a pneumatic straw-stacker, the combination with a straw-delivery duct, and power devices for vibrating said duct horizontally, of a deflector supported on and extending partially beyond the straw-duct, a lever fulcrumed at one side of the duct and connected with the deflector, connections between such lever and the power devices for vibrating said duct horizontally, and means for adjusting the fulcrum of the lever longitudinally of the straw-duct, substantially as set forth.

6. In a pneumatic straw-stacker, the combination with a duct for air and straw, a horizontally-rotatable support for the inner end of said duct, a brace for supporting the outer end of the duct, and power devices for actuating the horizontally-rotatable duct-support, of a deflector supported on the duct, a lever fulcrumed at one side of the duct and adapted to have its fulcrum adjusted toward and from and longitudinally of the duct, connections between the lever and the deflector, and connections between the lever and power devices, whereby the said deflector will be automatically reciprocated on the duct when the mechanism is in operation, substantially as set forth.

7. In a pneumatic straw-stacker, the combination with a horizontally-rotatable straw-discharge duct, of a deflector supported on the duct, a lever having at one end a yoke adapted to extend on opposite sides of the duct and engage with the deflector, power devices, and connections between the lever and the power devices for automatically actuating the lever to reciprocate the deflector longitudinally of the straw-duct, substantially as set forth.

8. In a pneumatic straw-stacker, the combination with a horizontally-rotatable tube or spout, of a deflector mounted on said spout to move forward or back thereon, an operating arm or rod connected at one end to said deflector, and means for moving the other end of said arm or rod through a path concentric with the axis of the horizontal movement of the stacker, substantially as set forth.

9. In a pneumatic stacker, the combination with a supporting-frame, a vibrating plate or table mounted on the frame, and a delivery-tube connected to said plate or table, of a deflector mounted on the tube and projecting beyond the discharge end thereof, a lever for reciprocating said deflector, an operating-rod having one end connected to said lever, and means for oscillating the stacker-tube and other end of the deflector-operating rod about a common axis, substantially as set forth.

10. In a pneumatic stacker, the combination with a supporting-frame, a vibrating plate or table on said frame, a delivery-tube carried by said plate or table, and means for oscillating said table and tube horizontally, of a deflector mounted on the tube to move longitudinally thereof, a lever fulcrumed at one side of the tube and loosely connected with the deflector, connections between said lever and the means for oscillating the stacker-tube, and means for varying the throw of the lever, substantially as set forth.

11. In a pneumatic stacker, the combination with a supporting-frame, a stacker-tube connected to the frame, and means for vibrating said tube horizontally, of a brace having one end connected to the tube and its other end pivoted to the supporting-frame, a deflector mounted on and projecting beyond the outer end of the tube, a lever fulcrumed on a support carried by the brace and loosely connected to the deflector for reciprocating the same, and connections between the lever and the means for vibrating the stacker-tube, substantially as set forth.

12. In a pneumatic stacker, the combination of the framework, the power devices, the straw-delivery duct vibratable around a vertical axis and having an inner part and an outer part telescopically connected, means for automatically moving the outer part of the duct longitudinally of the inner part, and driving devices for the said means at the aforesaid vertical axis and connected to the power devices, substantially as set forth.

13. In a pneumatic stacker, an ejector-fan having a cut-off disk or plate $f'$, transverse to the axis, blades $f^3$ with inclined front edges, secured to the rear side of the plate and extending to the front side thereof, and the casing-walls arranged substantially as set forth to provide a relatively narrower straw-receiving chamber or passage and a wider chamber in which the blades of the fan or ejector revolve, substantially as set forth.

14. In a pneumatic stacker, the combination with an ejector-fan, a casing for the fan, a stationary duct communicating with the ejector-casing, and a revoluble plate fitted about said stationary duct, of a discharge tube or trunk consisting of two sections telescopically connected together, the inner section extending through the said revoluble plate and communicating with the stationary duct, a guide mounted on the revoluble plate, independently of the inner trunk-section, and connections between such guide and the inner end of the outer trunk-section, substantially as set forth.

15. In a pneumatic stacker, the combination with a fan or ejector, a casing therefor, and a stationary duct communicating with said fan or ejector casing, of a discharge-trunk consisting of two sections telescopically connected together and adapted to rotate about the mouth of the stationary duct, a guide-bar supported independently of but extending parallel to the inner trunk-section, and means secured to the outer trunk-section and engaging with said guide-bar, substantially as set forth.

16. In a pneumatic stacker, the combination of an ejector or fan, a casing for the ejector, a discharge trunk or spout having an inner section, communicating with the ejector-casing, and an outer section loosely surrounding the outer end of the inner section, means for adjusting the outer end of the outer section vertically, a guide-bar extending parallel to the inner trunk-section, and an arm connected to the outer trunk-section and provided with guide wheels or rollers adapted to contact with said guide-bar, substantially as set forth.

17. In a pneumatic stacker, the combination with a fan or ejector, a casing for the ejector, a stationary duct communicating with the ejector-chamber, a discharge-trunk having an inner section, mounted to rotate horizontally about said stationary duct, and an outer section telescopically connected to the inner section, means for adjusting the outer end of the outer section vertically, a guide-bar supported adjacent to the inner trunk-section, an arm attached to the outer trunk-section and extending rearwardly therefrom, and guide-rollers mounted on said arm and arranged to contact with opposite sides of said guide-bar, substantially as set forth.

18. In a pneumatic stacker, the combination of a revoluble support, a discharge or delivery duct having an inner section mounted on and rotating with said support, and another section telescopically connected with and vertically adjustable in relation to said inner section, two guides mounted on the said revoluble support on opposite sides of the said inner section, and devices connected to the said vertically-adjustable duct-section and engaging with both said guides, to maintain the inner end of the last said section in proper position with relation to the inner duct-section at all times, substantially as set forth.

19. In a pneumatic stacker, the combination of an inner longitudinally-curved delivery duct-section, another duct-section telescopically connected to said inner section and adapted to be adjusted vertically, two guides extending concentric with the said inner duct-section, and means on the said vertically-adjustable duct-section engaging with and freely movable longitudinally of said guides, substantially as set forth.

20. In a pneumatic stacker, the combination of an inner delivery duct-section, a horizontally-rotatable support for said duct-section, another duct-section telescopically connected with said inner section and adapted to be adjusted vertically, two guides arranged on opposite sides of said inner section, and two sets of guide wheels or rollers carried by supports extending in opposite directions from the said vertically-adjustable duct-section and contacting with said guides, substantially as set forth.

In testimony whereof I affix my signature in presence of two witnesses.

JOHN B. BARTHOLOMEW.

Witnesses:
HARRY N. BLACKMON,
H. H. BLISS.